United States Patent Office 3,472,982
Patented Oct. 14, 1969

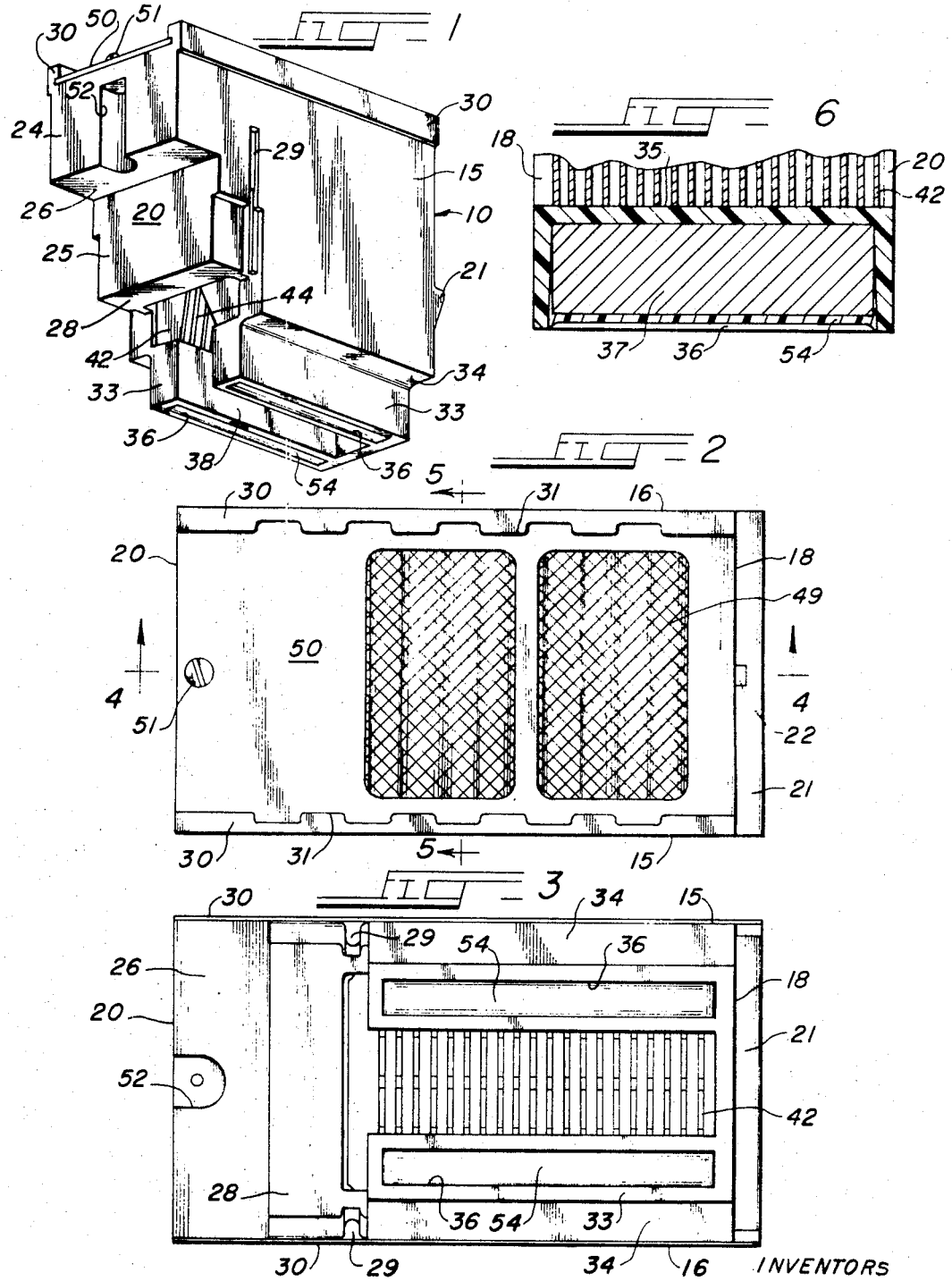

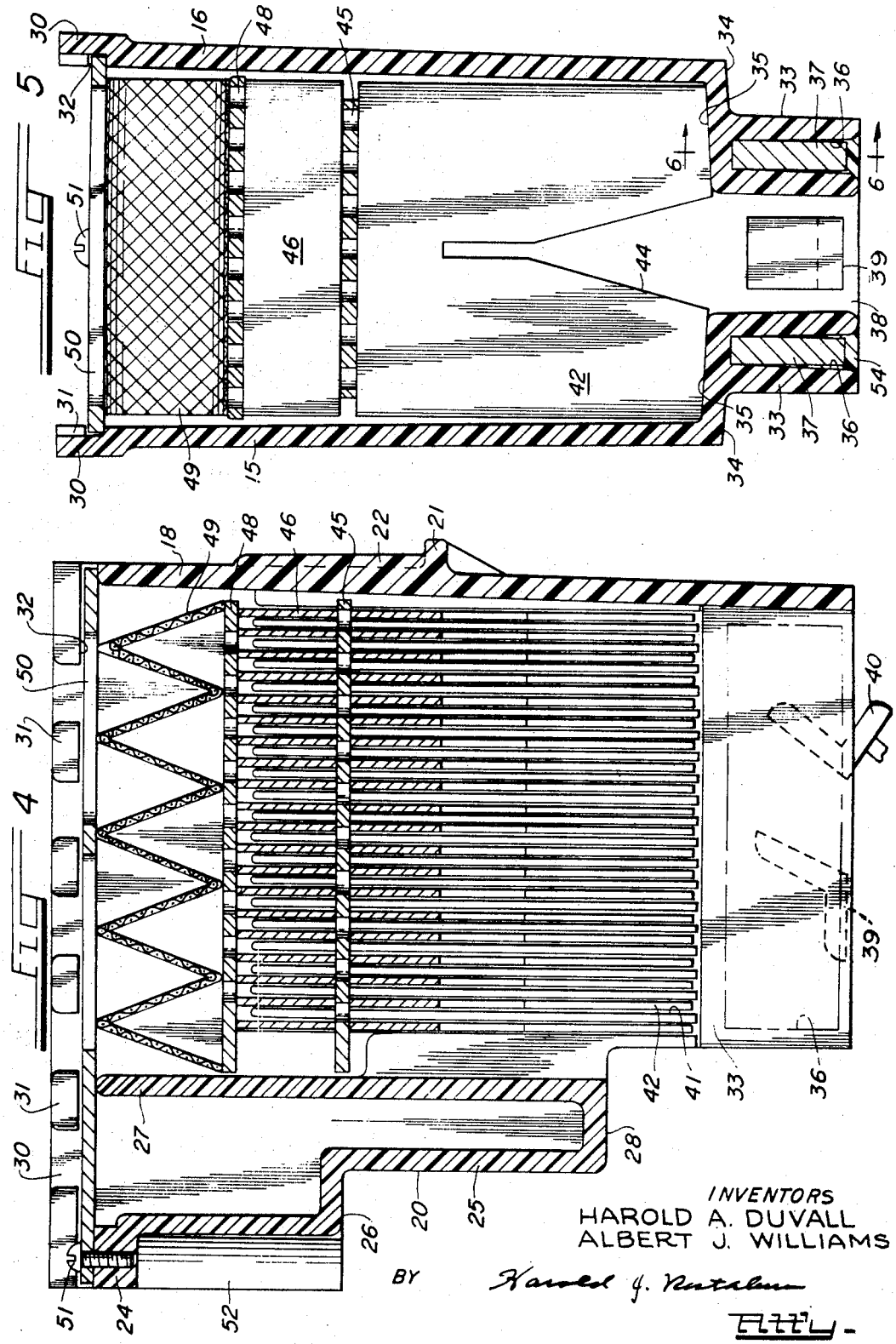

3,472,982
ARC CHUTE
Harold A. Duvall, Pasadena, and Albert J. Williams, Covina, Calif., assignors to Square D Company, Park Ridge, Ill., a corporation of Michigan
Filed July 29, 1966, Ser. No. 568,824
Int. Cl. H01h 9/30, 33/02
U.S. Cl. 200—144                              3 Claims

ABSTRACT OF THE DISCLOSURE

An arc chute comprising a single-piece molded housing having self-contained field-distorting means for assisting the movement of an arc from separable contacts into an arcing chamber defined by the housing and containing arc-deionizing and cooling means.

---

The invention is an improvement on the arc chute disclosed in U.S. patent application Serial No. 472,427, filed July 16, 1965, in the name of Fred Bould and owned by the assignee of this application. In the arc chute of the prior application, the housing is formed of two molded parts which are bolted together to define an arcing chamber therebetween. The field-distorting means are molded in the respective housing parts in respective recesses opening horizontally. The housing parts are designed to be removed from the mold in a direction transverse to their vertical axes. In accordance with this invention, the housing is a single-piece molding which is designed to be withdrawn from the mold in the direction of its vertical axis and the field-distorting means are properly positioned in the respective side walls of the housing either by being molded in the side walls in respective recesses opening downwardly or by being cemented in such recesses after the molding operation. The housing is so designed that a mold having not more than two side pulls may be used.

It is an object of this invention to provide an improved arc chute for a circuit breaker.

Another object is to provide an arc chute having a one-piece housing in which a pair of field-distorting means are molded within opposite side walls of the housing.

Further objects and advantages will become apparent from the following description wherein reference is made to the drawings, in which:

FIG. 1 is a perspective view of an arc chute in accordance with this invention looking from the lower rear thereof;

FIG. 2 is a top plan view of the arc chute of FIG. 1;

FIG. 3 is a bottom plan view of the arc chute of FIG. 1;

FIGS. 4 and 5 are sectional views taken as indicated at 4—4 and 5—5, respectively, of FIG. 2; and FIG. 6 is a fragmentary sectional view taken generally along the lines 6—6 of FIG. 5.

Referring to the drawings, an arc chute in accordance with this invention comprises a housing 10 molded of arc-resisting insulating material such as polyester glass and having a pair of side walls 15 and 16, a front wall 18, and a rear wall 20.

The front wall 18 has horizontally and vertically disposed reenforcing ribs 21 and 22, respectivey. The rear wall 20 has an upper portion 24 and an inwardly disposed lower portion 25 defining a downwardly facing shoulder 26 therebetween. The lower portion 25 terminates above the bottom edges of the side walls 15 and 16 to define a second downwardly facing shoulder 28. The lower portion of the arcing chamber defined by the housing 10 is thus open at the lower rear thereof. An intermediate wall 27 (FIG. 4) extends upwardly from the shoulder 28 in spaced relation from the rear wall portions 24 and 25.

The shoulder 26 and 28 and vertical grooves 29 formed in the side walls 15 and 16, respectively, serve to secure the arc chute on a mounting structure (not shown) in a well known manner.

Each of the side walls 15 and 16 has an upper flange portion 30 having inwardly directed spaced projections 31 defining an interrupted longitudinal milled groove 32, and an inwardly offset lower portion 33 defining a downwardly facing external shoulder 34 and an upwardly facing shoulder 35 inside of the housing. The shoulders 35 define a bottom wall portion of the arcing chamber with a central opening to permit entry of an arc and arc gasses. The lower portion 34 of each of the side walls 15 and 16 has, in accordance with this invention, a recess 36 receiving a ferrous plate 37 as will be described. The inwardly offset portions 33 define a space 38 therebetween for a stationary contact 39 and a movable contact 40 (FIGS. 4 and 5) of a circuit breaker with which the arc chute 10 is used.

The inner face of each of the side walls 15 and 16 is provided with a plurality of vertical grooves 41. Held by their margins within respective pairs of the grooves 41 and resting on the shoulders 35 are a plurality of magnetizable plates 42 each having a slot 44. A perforated spacer 45 rests on the top edges of the plates 42 and supports a plurality of insulating plates 46. A second spacer 48 rests on the top of the plates 46 and supports a sinuous copper screen 49. The plates 42 and 46 and the spacers 45 and 48 and the screen 49 are retained in assembled relation within the housing 10 by a closure frame 50 slidably received in the grooves 32 and secured by a screw 51 threaded into an opening formed in the wall portion 24 and opening into a cylindrical recess 52.

Referring now to the inwardly offset portions 33 of the side walls 15 and 16, each has a downwardly facing recess 36 receiving one of the ferrous plates 37 as previously mentioned. Preferably, the plates 37 are molded in the offset portion 34 thus to define the recesses 36. However, the recesses 36 may be defined by other means during the molding operation and the ferrous plates 37 inserted after the molding operation. If the latter procedure is followed, the walls of the recesses 36 are roughened as by sandblasting and the plates 37 are cemented in the recesses by a suitable adhesive. Irrespective of the mode of construction, the lower side edges of the plates 37 are covered with a suitable thermo-setting plastic material 54 to protect them from oxidation and also to assist in retaining them in position.

We claim:

1. An arc chute for confining and extinguishing an arc formed between separable contacts, said arc chute comprising a one-piece molded housing having bottom, front and rear wall portions and a pair of side wall portions defining an arcing chamber, a rectangular opening in said bottom wall portion disposed centrally of said side wall portions and elongated in a direction parallel to said side wall portions, spaced flange portions extending downwardy from said bottom wall portion along the respective side margins of said opening, said flange portions having respective downwardly opening recesses extending lengthwise thereof, and a pair of elongated magnetizable plates disposed in and substantially filling said recesses, respectively.

2. An arc chute in accordance with claim 1 wherein arc-dissipating plate means are supported in spaced-apart relationship within said chamber on said bottom wall portion.

3. An arc chute in accordance with claim 2 wherein spaced projections extend inwardly from the upper portions of each of said side wall portions to define a pair of horizontally aligned interrupted grooves, and a retaining frame is slidably received in said grooves.

References Cited

UNITED STATES PATENTS 2,822,448  2/1958  Wegmann.
3,374,332  3/1968  Bould _____ 200—144

ROBERT S. MACON, Primary Examiner

U.S. Cl. X.R.
200—147, 168